US009256666B2

(12) United States Patent
Conzola et al.

(10) Patent No.: US 9,256,666 B2
(45) Date of Patent: Feb. 9, 2016

(54) LINKING OF A PLURALITY OF ITEMS OF A USER INTERFACE TO DISPLAY NEW INFORMATION INFERRED FROM THE PLURALITY OF ITEMS THAT ARE LINKED

(75) Inventors: Vincent Charles Conzola, Raleigh, NC (US); Todd Michael Eischeid, Raleigh, NC (US); Mark E. Molander, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 549 days.

(21) Appl. No.: 12/968,034

(22) Filed: Dec. 14, 2010

(65) Prior Publication Data
US 2012/0151418 A1 Jun. 14, 2012

(51) Int. Cl.
*G06F 17/30* (2006.01)

(52) U.S. Cl.
CPC ............................ *G06F 17/30637* (2013.01)

(58) Field of Classification Search
CPC ... G06F 3/0481; G06F 3/0482; G06F 3/0484; G06F 9/4443
USPC .......................................................... 715/853
See application file for complete search history.

(56) References Cited

U.S. PATENT DOCUMENTS

| 6,829,615 | B2* | 12/2004 | Schirmer et al. | |
| 7,636,898 | B2* | 12/2009 | Takahashi | 715/769 |
| 2002/0147963 | A1* | 10/2002 | Lee | 717/108 |
| 2004/0196310 | A1* | 10/2004 | Aamodt et al. | 345/738 |
| 2005/0132286 | A1* | 6/2005 | Rohrabaugh et al. | 715/523 |
| 2005/0188332 | A1* | 8/2005 | Kolman | 715/822 |
| 2006/0075387 | A1* | 4/2006 | Martin et al. | 717/124 |
| 2006/0080465 | A1* | 4/2006 | Conzola et al. | 709/245 |
| 2006/0149783 | A1* | 7/2006 | Harrison et al. | 707/104.1 |
| 2006/0161855 | A1* | 7/2006 | Robertson et al. | 715/765 |
| 2007/0130362 | A1* | 6/2007 | Oommen et al. | 709/238 |
| 2007/0299867 | A1* | 12/2007 | Baldwin et al. | 707/103 R |
| 2008/0005675 | A1* | 1/2008 | Alderson et al. | 715/734 |
| 2008/0120153 | A1* | 5/2008 | Nonemacher et al. | 705/7 |
| 2008/0201705 | A1* | 8/2008 | Wookey | 717/175 |
| 2009/0118845 | A1* | 5/2009 | Eldridge et al. | 700/86 |
| 2010/0058188 | A1* | 3/2010 | Shah et al. | 715/734 |
| 2010/0185905 | A1* | 7/2010 | Brugler et al. | |
| 2011/0185304 | A1* | 7/2011 | Conzola et al. | 715/772 |
| 2012/0284667 | A1* | 11/2012 | Willekes et al. | 715/810 |

FOREIGN PATENT DOCUMENTS

EP 2026216 2/2009

* cited by examiner

*Primary Examiner* — Ajay Bhatia
*Assistant Examiner* — Haimei Jiang
(74) *Attorney, Agent, or Firm* — Rabindranath Dutta; Konrad Raynes Davda & Victor LLP (57) ABSTRACT

A first item and a second item that are displayed in a user interface are selected via a computational device. A determination is made as to whether a linkage between the first item and the second item is a valid linkage, wherein the valid linkage indicates that inferences that relate the first item to the second item may be drawn by interpreting properties of the first item and properties of the second item. In response to determining that the linkage between the first item and the second item is a valid linkage, the properties of the first item and the properties of the second item are interpreted to infer new properties that relate the properties of the first item to the properties of the second item.

16 Claims, 10 Drawing Sheets

| Component Name | Severity | Date | Event ID | Message |
|---|---|---|---|---|
| Fan 01 | ⚠ Attention | 03/13/10 | 0x23455c1 | Fan speed below threshold. |
| Fan 01 | ! Information | 03/14/10 | 0x894420 | Fan was inserted |
| Fan 01 | ! Information | 03/15/10 | 0x894420 | Fan was removed |
| Fan 01 | ! Information | 03/16/10 | 0x23455c1 | Fan was inserted |
| Fan 02 | ! Information | 03/17/10 | 0x2234dc | Fan was removed |
| Fan 02 | ! Information | 03/18/10 | 0x2345444 | Fan was inserted |
| Fan 02 | ⚠ Attention | 03/19/10 | 0x23445c1 | Fan speed below threshold. |
| Fan 03 | ! Information | 03/20/10 | 0x990124 | Fan was removed |
| Fan 03 | ! Information | 03/21/10 | 0x290001 | Fan was inserted |
| Fan 03 | ! Information | 03/22/10 | 0xaac00978 | Fan was removed |
| Fan 04 | ⚠ Attention | 03/23/10 | 0x2310873 | Fan speed below threshold. |

Popup display (on User Interface)

LINKING OF A PLURALITY OF ITEMS OF A USER INTERFACE TO DISPLAY NEW INFORMATION INFERRED FROM THE PLURALITY OF ITEMS THAT ARE LINKED

BACKGROUND

1. Field

The disclosure relates to a method, a system, and a computer program product for the linking of a plurality of items of a user interface to display new information inferred from the plurality of item that are linked.

2. Background

Numerous visible items may be displayed in certain user interfaces. The visible items may be interconnected in a hierarchical navigation tree or in some other form. In certain situations, in the hierarchical navigation tree displayed in the user interface, there may be a node associated with properties available for a piece of hardware, such as, a server, wherein the node may be referred to as a "server" node. Additionally, another node that is different from the "server" node may represent security tasks that are available, wherein the node that represents security tasks that are available may be referred to as a "security" node.

In certain user interfaces, if the user selects the "server" node by itself in the hierarchical navigation tree, the user interface may display information related to the server. Furthermore, if the user selects the "security" node by itself, the information that is displayed may be associated with security tasks, such as, general security protocols, etc.

SUMMARY OF THE PREFERRED EMBODIMENTS

Provided are a method, a system, and a computer program product in which a first item and a second item that are displayed in a user interface are selected via a computational device. A determination is made as to whether a linkage between the first item and the second item is a valid linkage, wherein the valid linkage indicates that inferences that relate the first item to the second item may be drawn by interpreting properties of the first item and properties of the second item. In response to determining that the linkage between the first item and the second item is a valid linkage, the properties of the first item and the properties of the second item are interpreted to infer new properties that relate the properties of the first item to the properties of the second item.

In additional embodiments, the linkage in the user interface is highlighted and in response to selecting the highlighted linkage in the user interface, the new properties are displayed.

In yet additional embodiments, the first item and second item are nodes of a hierarchical tree displayed in the user interface, wherein the hierarchical tree displays a plurality of items including the first item and the second item, and wherein the plurality of items comprise elements of a software, hardware or firmware system. In response to selecting the first item and the second item and in response to determining that the linkage between the first item and the second item is a valid linkage, the linkage between the first item and the second item is highlighted in the user interface.

In further embodiments, the new properties include at least an inferred property that is not directly found in either the properties of the first item or the properties of the second item.

In yet further embodiments, the first item represents a selected hardware component, the second item represents events associated with a plurality of hardware and software components; and the displayed new properties show events associated with the selected hardware component.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Linking Items to Infer New Information in a User interface

Some types of desired actions on a user interface may be difficult to achieve with certain user interface designs. There may be numerous visible items on a user interface, but certain interaction models may not allow the user to link multiple items via a linkage in order to observe the relevancy of the linkage or to determine what information may be discerned from two specifically linked items.

For example, in certain situations, the exact method for obtaining security related information on a server may not be immediately obvious in a user interface that has a "server" node and a "security" node, wherein the "server" node has server related information, and the "security" node has security related information for both clients and servers. Certain embodiments allow two visible items to be directly connected to obtain this information. For example, in certain embodiments, the "server" node and the "security" node may be directly connected via a linkage, and the linkage on being clicked may display security related information on the server, wherein the displayed security related information may be newly inferred information not explicitly indicated in properties of the "server" node or the "security" node. The act of the user linking the "server" node to the "security" nodes causes the generation of this newly inferred information.

Certain embodiments, allow users to connect in a user interface, at least two items that the user sees on the user interface. The user is also allowed to view an intersection of available actions or properties associated with the intersection between the at least two items. Such embodiments may facilitate the viewing of desired content that may otherwise require many user interactions with the interface, by allowing the user to connect two or more visible items together and by having the system determine the relevancy and intersection of the information associated with the items.

In certain exemplary embodiments, in an exemplary user interface, such as a hierarchical navigation tree, additional element or elements are overlaid so as to visually indicate to the user that connections between or among items are possible. In certain embodiments, these additional elements are represented as a connection bus. In such embodiments, individual items are connected to a global bus and all items connected to the global bus also have connections to each other. The linkage between any two items may be selectable on the user interface and the intersection defined by a given linkage may have properties. The meaning of a given intersection may be predetermined, such as by a look-up table that indicates operations an application should perform for each linkage, and which linkages are not applicable. Additionally, in certain embodiments new properties of a link joining two items are determined algorithmically via inference algorithms.

Exemplary Embodiments

Figure 1:
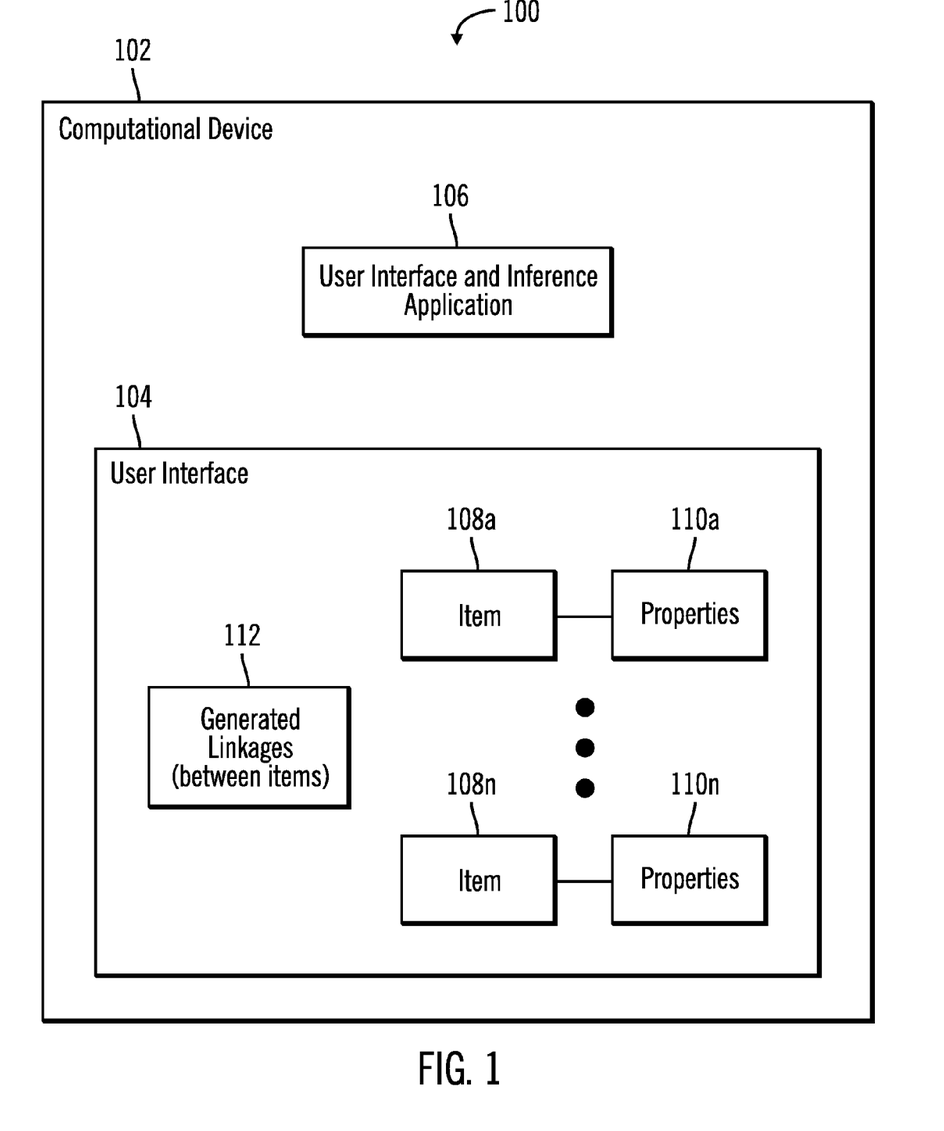
FIG. 1 illustrates a block diagram of a computing environment that includes a computational device displaying a user interface, in accordance with certain embodiments.

FIG. 1 illustrates a block diagram of a computing environment 100 that includes a computational device 102 displaying a user interface 104, in accordance with certain embodiments. The computational device 102 may be any suitable device including those presently known in the art, such as, a personal computer, a workstation, a server, a mainframe, a hand held computer, a palm top computer, a telephony device, a network appliance, a blade computer, a storage server, a storage controller, etc. In certain embodiments, the computational device 102 may comprise cloud component parts included in a cloud computing environment.

The user interface 104 is generated by a user interface and inference application 106 that executes in the computational device 102. The user interface 104 may be displayed on a display monitor, such as a Liquid Crystal Display (LCD), coupled to the computational device. In certain embodiments, the display monitor such as the LCD, may be included as part of the computational device 102.

The user interface 104 may by configured to by the user interface and inference application 106 to display a plurality of items 108*a* . . . 108*n* and properties 110*a* . . . 110*n* corresponding to the plurality of items 108*a* . . . 108*n*. In certain embodiments, the plurality of items 108*a* . . . 108*n* may be objects, icons, text, etc., that represent elements of a software, hardware, or firmware system. The properties 110*a* . . . 110*n* may represent various attributes, events, actions, etc., that are associated with the items 108*a* . . . 108*n*.

In certain embodiments, the user interface and inference application 106 generates linkages 112 between two or more items of the plurality of items 108*a* . . . 108*n*. The user interface and interface application 106 configures the generated linkages 112, such that if a user clicks on a generated linkage that links two items, then new properties inferred from the properties of the two items are displayed in the user interface 104.

Figure 2:
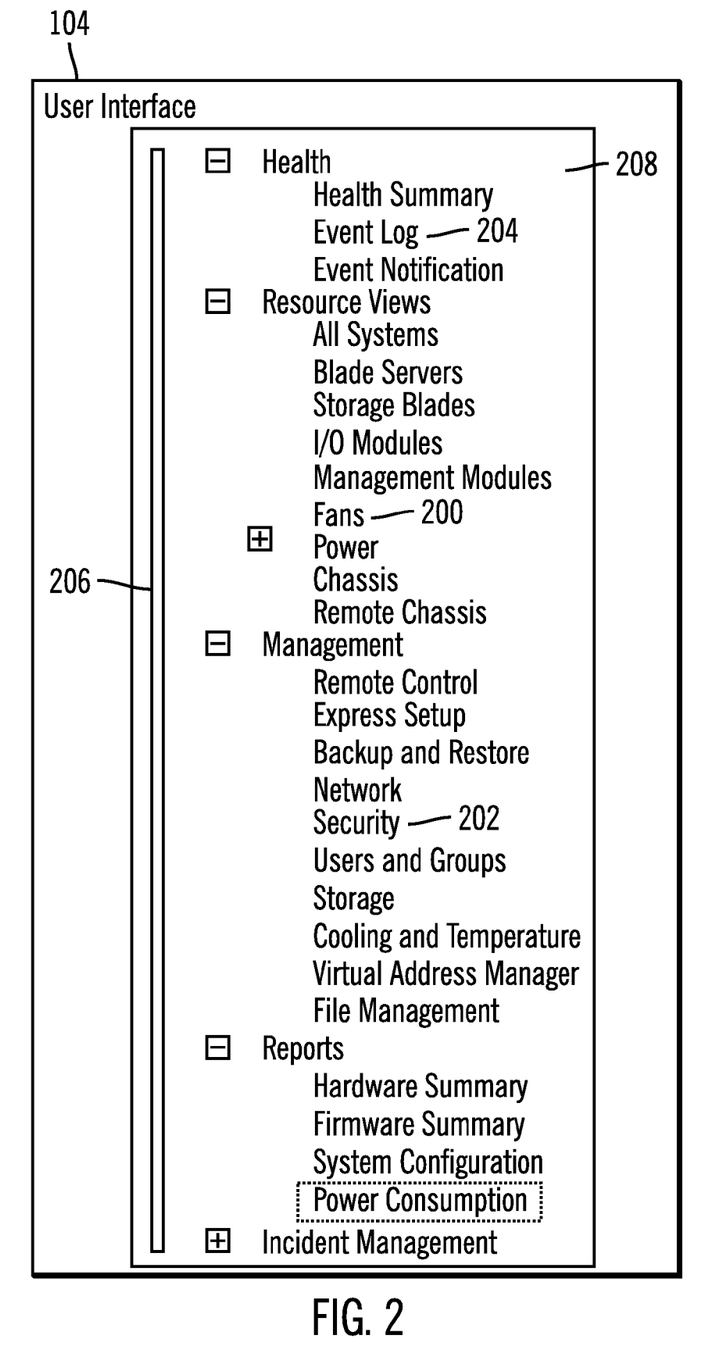
FIG. 2 illustrates a block diagram that shows how items are initially displayed in the user interface, in accordance with certain embodiments.

FIG. 2 illustrates a block diagram that shows how items are initially displayed in the user interface 104 implemented via the computational device 102, in accordance with certain embodiments. In FIG. 2, exemplary items, such as "Fans" 200, "Security" 202, "Event Log" 204, etc., are linked via a common bus 206 that is visible as a light gray outline to the left of the hierarchical tree 208 that includes the exemplary items. The light gray outline of the common bus 206 indicates that potential linkages are possible among the exemplary items 200, 202, 204, etc. It should be noted that the common bus 206 when represented via a light gray outline indicates potential linkages but not actual linkages, i.e., items of the hierarchical tree 208 may be potentially but not necessarily linked as a result of selection of one or more items by a user.

Figure 3:
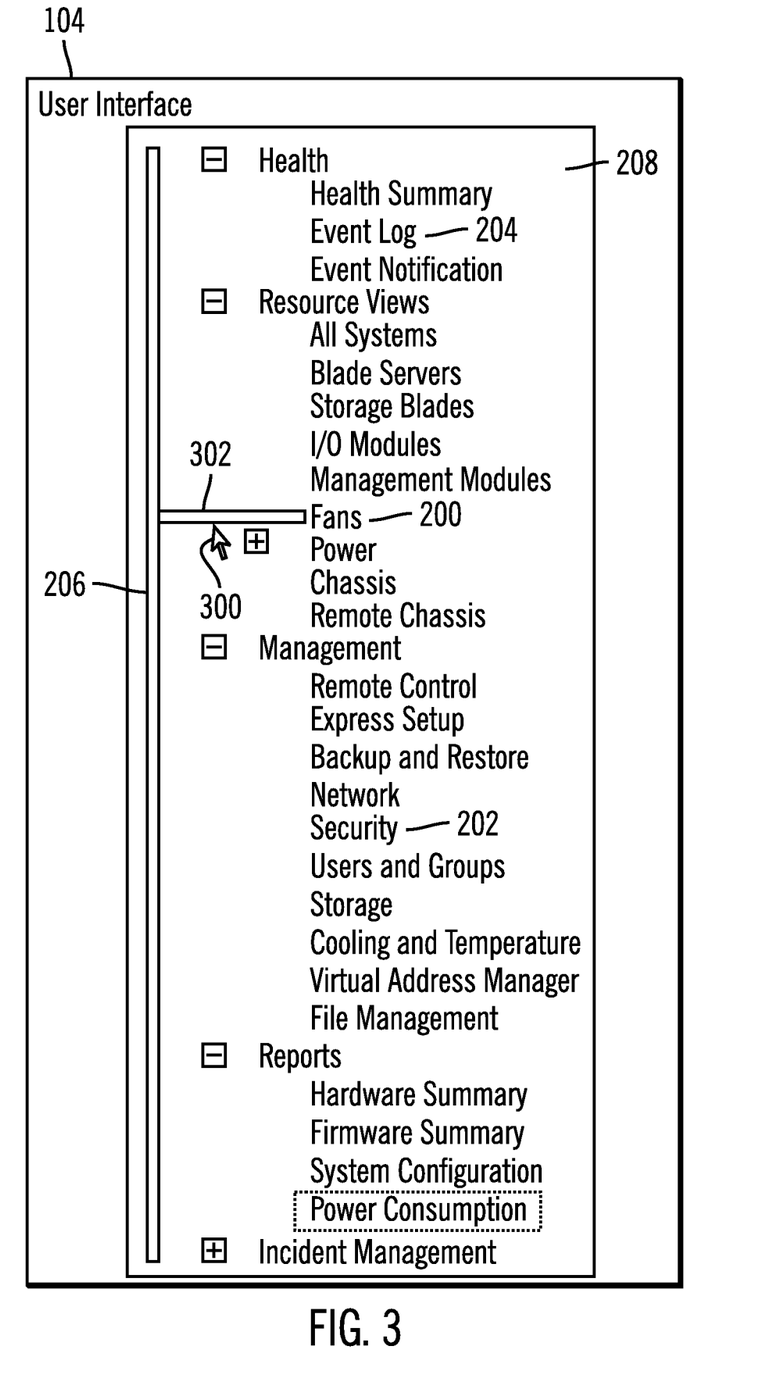
FIG. 3 illustrates a block diagram that shows how each item of the user interface may be clicked on, in accordance with certain embodiments.

FIG. 3 illustrates a block diagram that shows how each item of the user interface 104 may be clicked on by a user, in accordance with certain embodiments. Each item that the user hovers over via a cursor 300 indicates that the item is clickable. For example, in FIG. 3, a light gray outline 302 connected to the item "Fans 200", indicates that the item "Fans" 200 may be clicked on.

Figure 4:
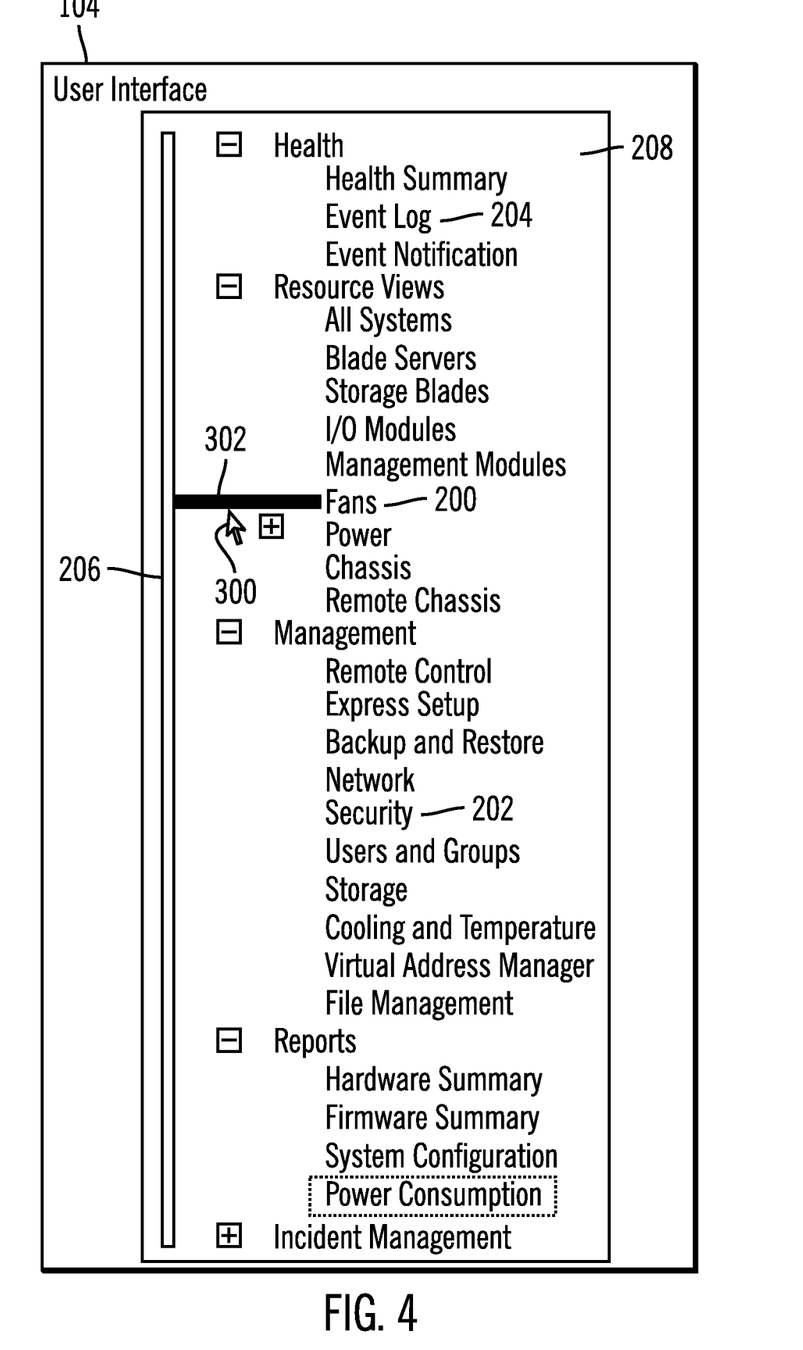
FIG. 4 illustrates a block diagram that shows how a user clicks a first link associated with a first item to activate the first link in the user interface, in accordance with certain embodiments.

FIG. 4 illustrates a block diagram that shows how a user clicks a first link associated with a first item to activate the first link in the user interface 104 implemented via the computational device 102, in accordance with certain embodiments. In an exemplary embodiment, shown in FIG. 4, the user clicks to activate the link 302 (highlighted in dark gray) and thus connects item "Fans" 200 to the common bus 206.

Figure 5:
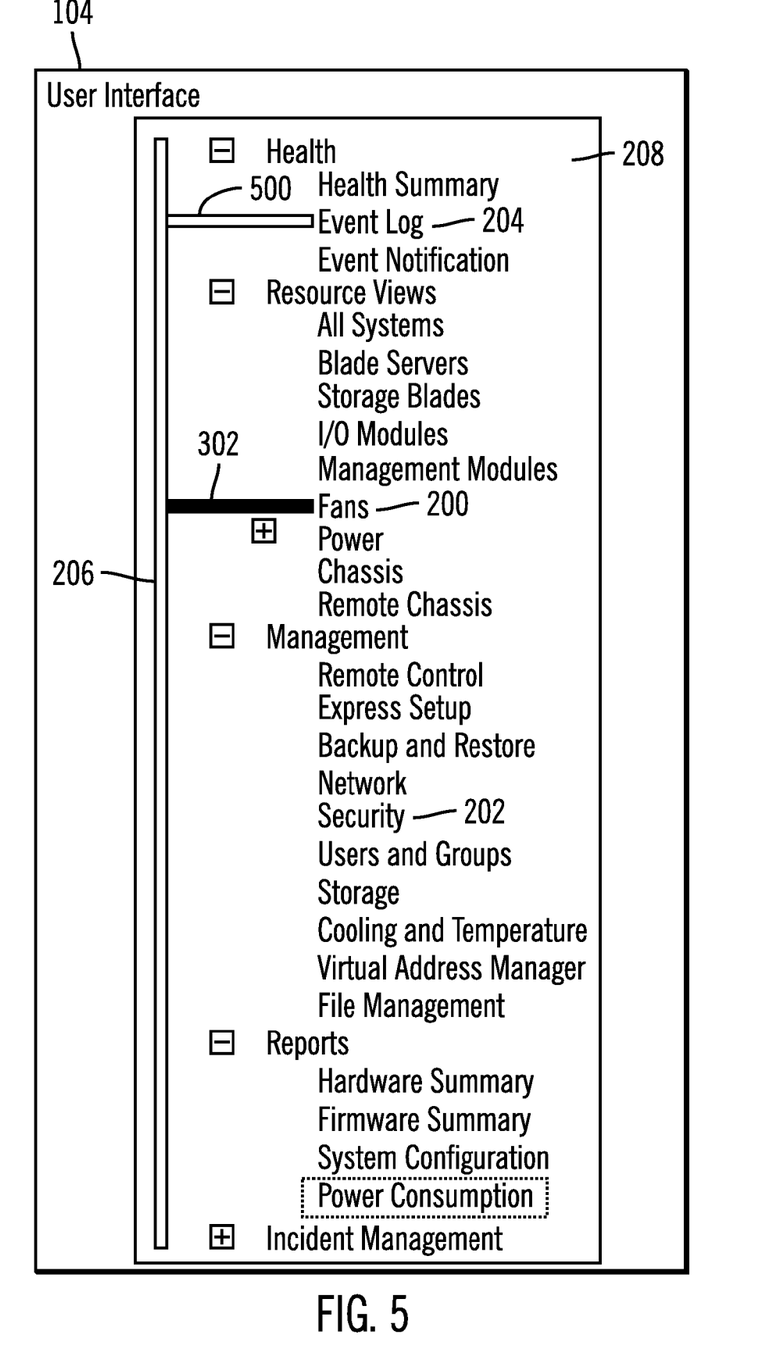
FIG. 5 illustrates a block diagram that shows how a user clicks a second link associated with a second item to activate the second link in the user interface, in accordance with certain embodiments.

FIG. 5 illustrates a block diagram that shows how a user clicks a second link associated with a second item to activate the second link in the user interface 104 implemented via the computational device 102, For example, in FIG. 5, in accordance with certain embodiments, the user moves the cursor to another item (e.g. "Event Log" 204) and selects the link 500, upon which the link 500 is highlighted.

Figure 6:
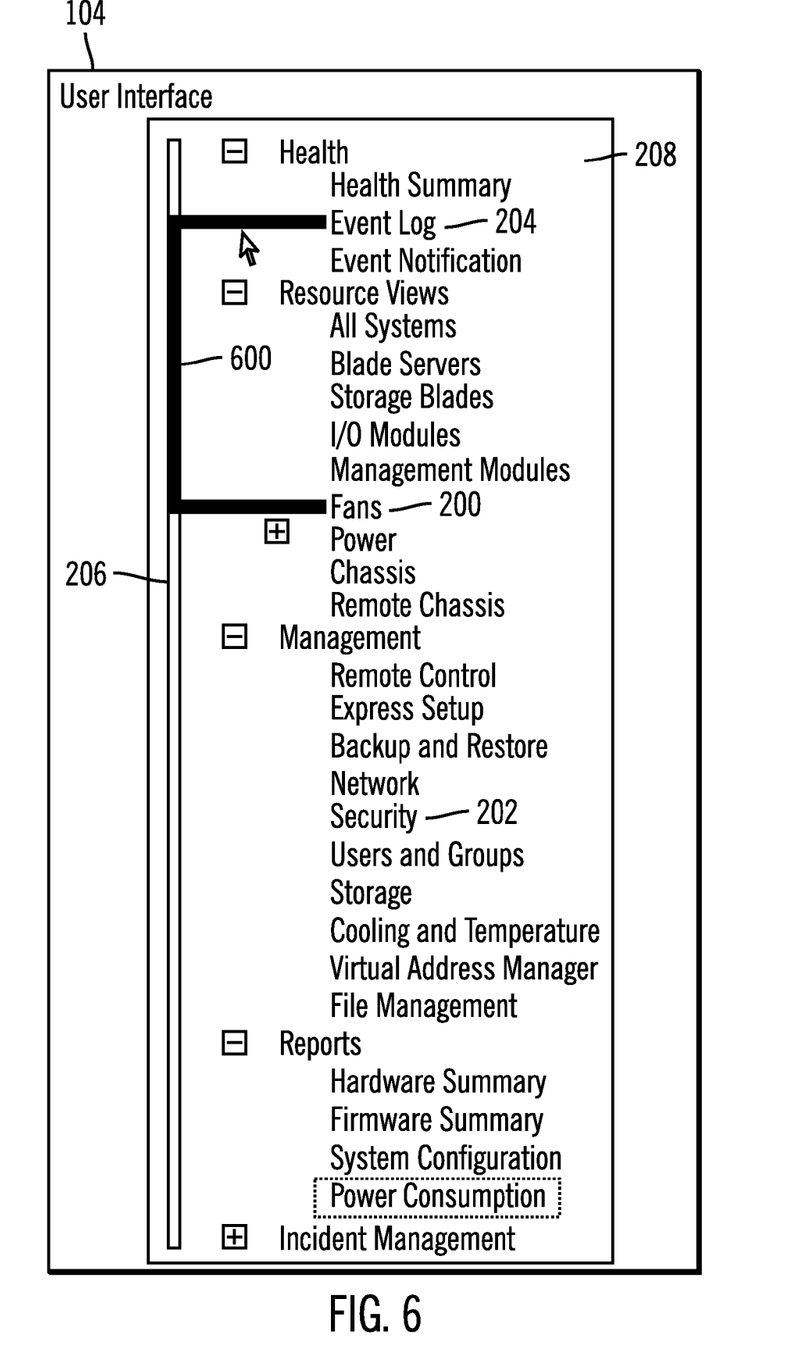
FIG. 6 illustrates a block diagram that shows how a linkage between the first item and the second item in the user interface is established as a valid linkage that is highlighted, in accordance with certain embodiments.

FIG. 6 illustrates a block diagram that shows how a linkage between the first item and the second item in the user interface 104 is established as a valid linkage 600 that is highlighted in the user interface 104 implemented via the computational device 102, in accordance with certain embodiments. In FIG. 5, when a second item, "Event Log" 204, is clicked, the path between the two items "Fans" 200 and "Event Log" 204 is highlighted and shown via the linkage 600. The highlighted linkage 600 may be referred to as a valid linkage connecting the "Fans" to the "Event Log". In FIG. 5, "Fans" 200 and "Event Log" 204 are connected, and the default action defined by the user interface and inference application 106 may be to view event log entries related to fans. In certain embodiments, the common bus 206 may remain independent of tree node selections, and the user may continue to interact normally with the tree items, while the bus selections and connections remains visible.

Connections between any two items may not always be feasible, as some components or tasks may have nothing in common with one another, i.e., not all potential linkages are valid linkages. These types of irrelevant or invalid linkages may be visually indicated so that the user is aware that a linkage is not applicable. For example, the invalid linkage may show a line with an error image (e.g., a red "x"), or the invalid linkage may appear as grayed-out, inactive, or disabled. For example, it is possible that on selection of "Fans 200" and "Security" 202 no valid linkages are formed even though both "Fans" 200 and "Security" 202 are shown as potentially coupled to the common bus 206. The user interface and inference application 106 may determine that no common properties or inferences that relate the "Fans" 200 to the "Security" 202 may be drawn by interpreting properties of the "Fans" 200 and properties of the "Security" 202, i.e., there may be no association between Fans 200 and Security 202 and in such a case even if the user selects "Fans" 200 and "Security" 202 no highlighted linkage connecting the "Fans" 200 to the "Security" 202 is shown in the user interface 104.

In alternative embodiments, in addition to the navigation trees shown in FIGS. 2-6, the common bus may be implemented via by other types of user interface elements. For example a tabbed property notebook may have a bus placed above the tabs, and the user may connect tabs to the bus.

Figure 7:
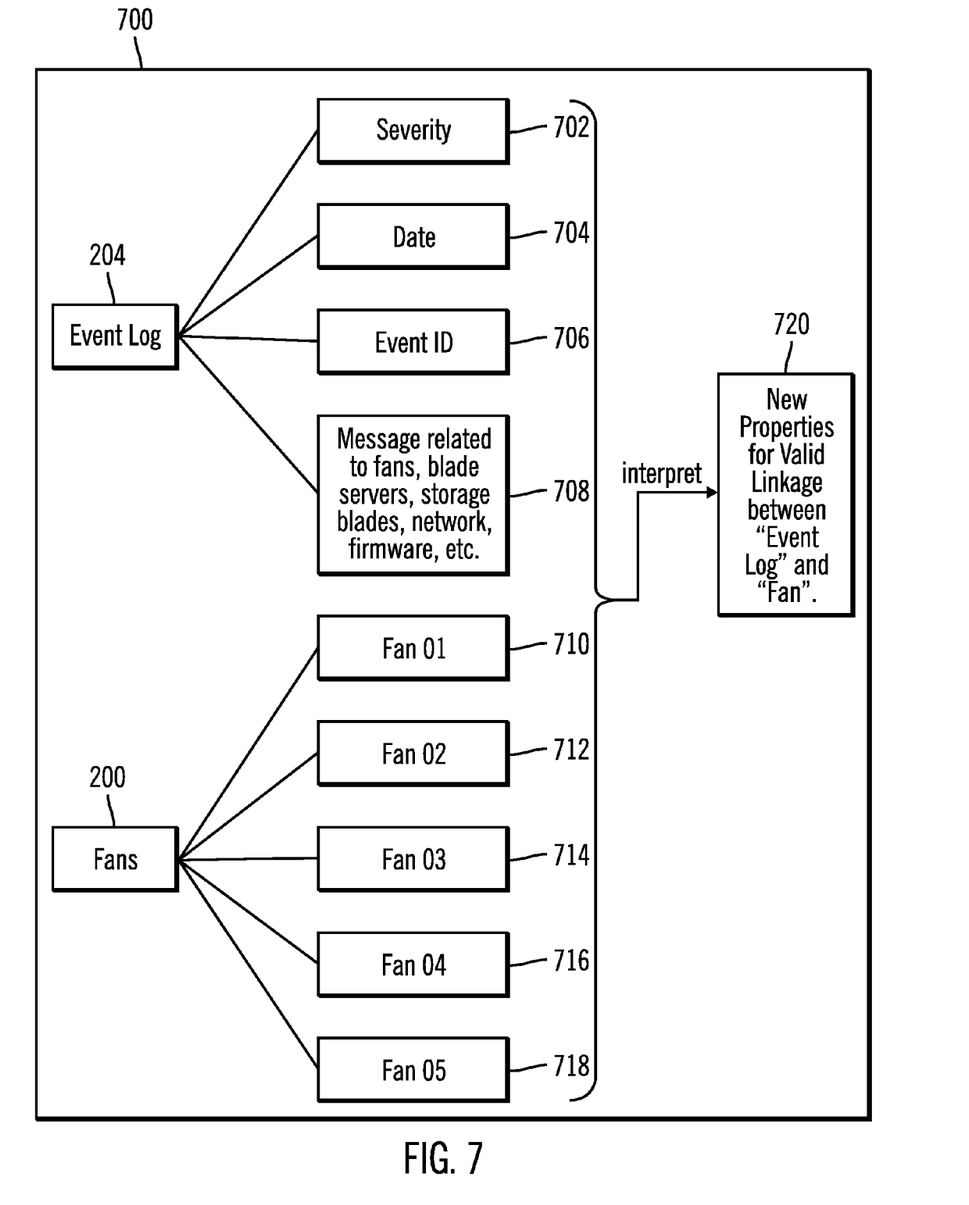
FIG. 7 illustrates a block diagram that shows exemplary properties of the first item and the second item and the inference of new properties of the valid linkage, in accordance with certain embodiments.

FIG. 7 illustrates a block diagram 700 what shows exemplary properties of the first item (i.e., the "Fans" 200) and the second item (i.e., the "Event Log" 204) and the inference of new properties of the valid linkage between the "Fans" 200 and the "Event Log" 204, in accordance with certain embodiments.

Exemplary properties of the "Event Log" 204 may include severity 702, date 704, event ID 706 that uniquely identifies the event, and message 708 related to fans, blade servers, network, firmware, etc. Therefore, the "Event Log" 204 describes events related to not just "Fans" 200 but also events related to other elements such as blade servers, network, firmware and other items that may be found in the user interface 104.

Exemplary properties of the Fans 200 may include five fans identified as Fan 01, Fan 02, Fan 03, Fan 04, Fan 05 (shown via reference numerals 710, 712, 714, 716, 718), in a system that has five fans.

In certain embodiments, the user interface and inference application 106 may interpret the properties 702, 704, 706, 708 of the "Event Log" 204 and the properties 710, 712, 714, 716, 718 of the "Fans" 200, to determine new properties 720 for valid linkages between the items "Event Log" 204 and "Fans" 200. In certain embodiments, the new properties include at least an inferred property that is not directly found in either the properties of the first item (e.g., "Fans" 200) or the properties of the second item (e.g., "Event Log" 204).

Figure 8:
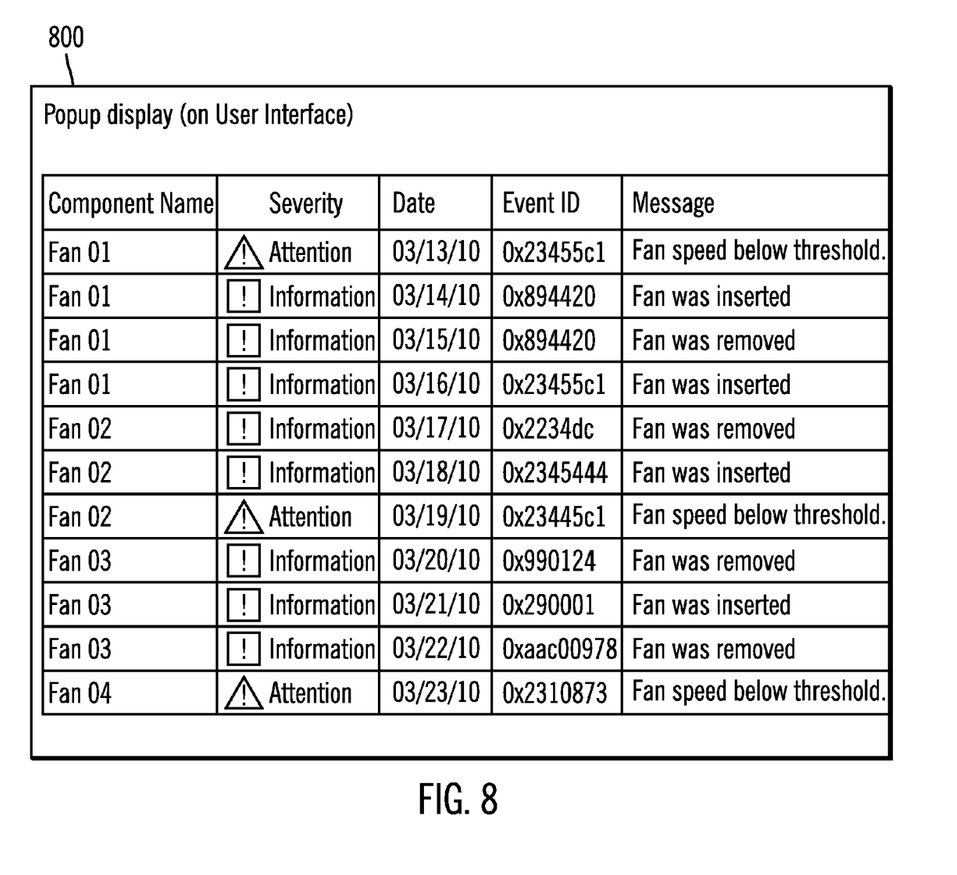
FIG. 8 illustrates a block diagram that shows how new properties of the valid linkage are displayed in the user interface, in accordance with certain embodiments.

FIG. 8 illustrates a block diagram that shows in a popup display 800 on the user interface 104 how new properties 720 of the valid linkage are displayed in the user interface 104, in accordance with certain embodiments. If the user did select the valid linkage (shown via reference numerals 600 in FIG. 6) between the "Fans" 200 and "Event Log" 204, then the user may be displayed an exemplary popup display 800 that contains event log entries filtered for fans. The valid linkage 600 shown on the connection bus 206 in FIG. 6 behaves as a selectable item in the user interface 104. The user clicks on the valid linkage 600 to see the content just as if the user clicked on any other single node in the hierarchical tree 208. The valid linkage 600 remains active and visible until the user indicates that the valid linkage 600 should be deactivated.

Figure 9:
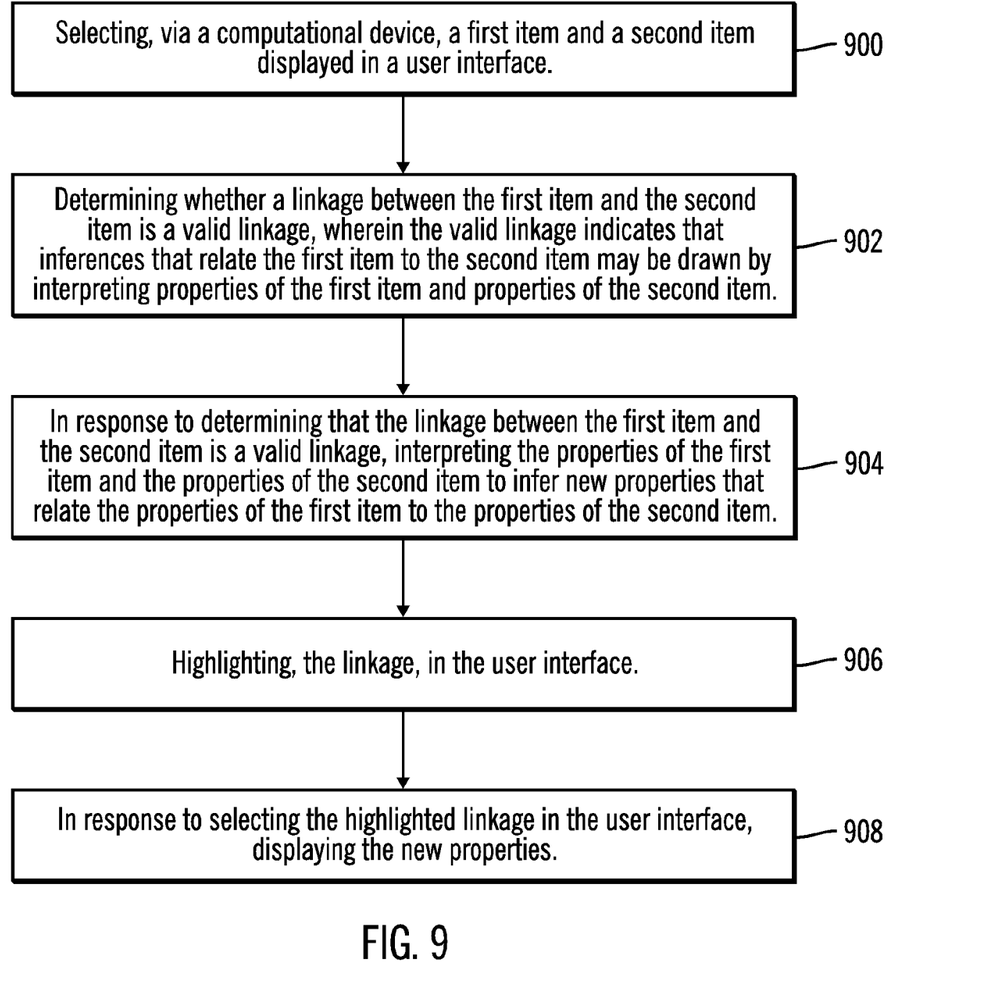
FIG. 9 illustrates a flowchart that shows operations performed by the computational device in the computing environment, in accordance with certain embodiments.

FIG. 9 illustrates a flowchart that shows operations performed by the user interface and inference application 106 that executes in the computational device 102 of the computing environment 100, in accordance with certain embodiments.

Control starts at block 900, in which a first item 200 (e.g., Fans) and a second item 204 (e.g., Event Logs) that are displayed in a user interface 104 are selected via a computational device 102. A determination is made (at block 902) as to whether a linkage between the first item and the second item is a valid linkage 600, wherein the valid linkage indicates that inferences that relate the first item 200 to the second item 204 may be drawn by interpreting properties of the first item 200 and properties of the second item 204. In response to determining that the linkage between the first item and the second item is a valid linkage 600, the properties 710, 712, 714, 716, 718 of the first item 200 and the properties 702, 704, 706, 708 of the second item 204 are interpreted (at block 904) to infer new properties 720 that relate the properties of the first item 200 to the properties of the second item 204.

Control proceeds to block 906, in which the user interface and inference application 106 highlights the linkage 600 in the user interface 104. In response to selecting the highlighted linkage 600 in the user interface 104, the new properties 720 are displayed (at block 908). For example, in certain embodiments, the new properties 720 are displayed in the popup display 800.

Therefore, FIGS. 1-9 illustrate certain embodiments, in which valid linkages are determined between two or more items shown in a user interface 104. On selection of a valid linkage between two or more items by a user, new properties inferred from individual properties of the items that are linked via the valid linkage are displayed in the user interface 104.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
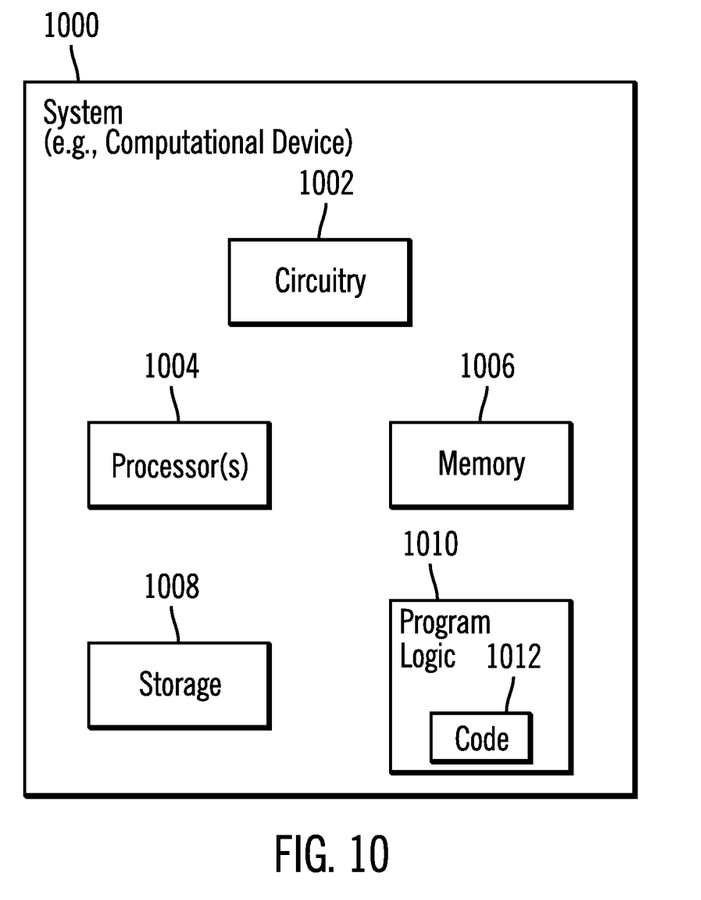
FIG. 10 illustrates a block diagram of a computational system that shows certain elements that may be included in the computational device of FIG. 1, in accordance with certain embodiments.

FIG. 10 illustrates a block diagram that shows certain elements that may be included in a system 1000 in accordance with certain embodiments. The system 1000 may comprise the computational device 102 and may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

In certain embodiments, the computational device 102 may comprise cloud component parts included in a cloud computing environment. In the cloud computing environment the systems architecture of the hardware and software components involved in the delivery of cloud computing may involve a plurality of cloud components communicating with each other. For example, in certain embodiments, the computational device 102 of FIG. 1 may provide clients, and other servers and software and/or hardware components in a networked cloud with storage and data processing services. The computational device 102 may communicate with clients to provide storage and other services for the storage devices 104 through a web interface or other application programming interface.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    selecting, via a first user selection, a first item that is displayed in a user interface;
    selecting, via a second user selection, a second item that is displayed in the user interface;
    subsequent to selecting the first item and the second item, determining, via a computational device, a type of linkage between the first item and the second item, wherein the linkage is a displayed linkage, wherein a valid linkage indicates that inferences that relate the first item to the second item may be drawn by interpreting properties of the first item and properties of the second item;
    in response to determining that the type of linkage between the first item and the second item is a valid linkage, interpreting the properties of the first item and the properties of the second item to infer new properties that relate the properties of the first item to the properties of the second item, wherein the inferred new properties are not explicitly indicated in the properties of the first item or the properties of the second item, wherein a look-up table indicates operations that are to be performed by an application for the valid linkage, and wherein the valid linkage remains active and visible until a user indicates that the valid linkage is to be deactivated; and
    in response to determining that the type of linkage between the first item and the second item is an invalid linkage, indicating via a visual interface that the linkage between the first item and the second item is inapplicable, wherein:
        the first item represents a server node and has server related information, and the second item represents a security node that has security related information for both clients and servers, and wherein in response to a selected linkage between the server node and the security node being clicked, security related information of the server node that are not explicitly indicated in either properties of the server node or properties of the security node are displayed;
        the first item, the second item, and additional items displayed in the visual interface are all connected to a global bus, and the first item, the second item, and the additional items have linkages to each other;
        invalid linkages are visually apparent to the user, in response to viewing the visual interface, wherein invalid linkages are grayed-out in the visual interface;
        the first item represents a hardware component, wherein the properties of the first item include a plurality of instances of the hardware component; and
        the second item represents an event log that includes at least one of a severity, a date, and an identifier that uniquely identifies an event, and a message corresponding to the hardware component and the additional items in the visual interface.

2. The method of claim 1, further comprising:
    highlighting, the linkage, in the user interface; and
    in response to selecting the highlighted linkage in the user interface, displaying the new properties.

3. The method of claim 1, wherein:
    the first item and second item are nodes of a hierarchical tree displayed in the user interface, wherein the hierarchical tree displays a plurality of items including the first item and the second item, and wherein the plurality of items comprise elements of a software, hardware or firmware system; and
    in response to selecting the first item and the second item and in response to determining that the linkage between the first item and the second item is a valid linkage, the linkage between the first item and the second item is highlighted in the user interface.

4. A system comprising:
    a memory; and
    a processor coupled to the memory, wherein the processor performs operations, the operations comprising:
    selecting, via a first user selection, a first item that is displayed in a user interface;
    selecting, via a second user selection, a second item that is displayed in the user interface;
    subsequent to selecting the first item and the second item, determining, via a computational device, a type of linkage between the first item and the second item, wherein the linkage is a displayed linkage, wherein a valid linkage indicates that inferences that relate the first item to the second item may be drawn by interpreting properties of the first item and properties of the second item;
    in response to determining that the type of linkage between the first item and the second item is a valid linkage, interpreting the properties of the first item and the properties of the second item to infer new properties that relate the properties of the first item to the properties of the second item, wherein the inferred new properties are not explicitly indicated in the properties of the first item or the properties of the second item, wherein a look-up table indicates operations that are to be performed by an application for the valid linkage, and wherein the valid linkage remains active and visible until a user indicates the valid linkage is to be deactivated; and in response to determining that the type of linkage between the first item and the second item is an invalid linkage, indicating via a visual interface that the linkage between the first item and the second item is inapplicable, wherein:

the first item represents a server node and has server related information, and the second item represents a security node that has security related information for both clients and servers, and wherein in response to a selected linkage between the server node and the security node being clicked, security related information of the server node that are not explicitly indicated in either properties of the server node or properties of the security node are displayed;

the first item, the second item, and additional items displayed in the visual interface are all connected to a global bus, and the first item, the second item, and the additional items have linkages to each other;

invalid linkages are visually apparent to the user, in response to viewing the visual interface, wherein invalid linkages are grayed-out in the visual interface;

the first item represents a hardware component, wherein the properties of the first item include a plurality of instances of the hardware component; and the second item represents an event log that includes at least one of a severity, a date, and an identifier that uniquely identifies an event, and a message corresponding to the hardware component and the additional items in the visual interface.

5. The system of claim 4, the operations further comprising:
highlighting, the linkage, in the user interface; and
in response to selecting the highlighted linkage in the user interface, displaying the new properties.

6. The system of claim 4, wherein:
the first item and second item are nodes of a hierarchical tree displayed in the user interface, wherein the hierarchical tree displays a plurality of items including the first item and the second item, and wherein the plurality of items comprise elements of a software, hardware or firmware system; and
in response to selecting the first item and the second item and in response to determining that the linkage between the first item and the second item is a valid linkage, the linkage between the first item and the second item is highlighted in the user interface.

7. A computer program product, the computer program product comprising:
a non-transitory computer readable storage medium having computer readable program code embodied therewith, the computer readable program code configured to perform operations, the operations comprising:
selecting, via a first user selection, a first item that is displayed in a user interface;
selecting, via a second user selection, a second item that is displayed in the user interface;
subsequent to selecting the first item and the second item, determining, via a computational device, a type of linkage between the first item and the second item, wherein the linkage is a displayed linkage, wherein a valid linkage indicates that inferences that relate the first item to the second item may be drawn by interpreting properties of the first item and properties of the second item;
in response to determining that the type of linkage between the first item and the second item is a valid linkage, interpreting the properties of the first item and the properties of the second item to infer new properties that relate the properties of the first item to the properties of the second item, wherein the inferred new properties are not explicitly indicated in the properties of the first item or the properties of the second item, wherein a look-up table indicates operations that are to be performed by an application for the valid linkage, and wherein the valid linkage remains active and visible until a user indicates the valid linkage is to be deactivated; and
in response to determining that the type of linkage between the first item and the second item is an invalid linkage, indicating via a visual interface that the linkage between the first item and the second item is inapplicable, wherein:

the first item represents a server node and has server related information, and the second item represents a security node that has security related information for both clients and servers, and wherein in response to a selected linkage between the server node and the security node being clicked, security related information of the server node that are not explicitly indicated in either properties of the server node or properties of the security node are displayed;

the first item, the second item, and additional items displayed in the visual interface are all connected to a global bus, and the first item, the second item, and the additional items have linkages to each other;

invalid linkages are visually apparent to the user, in response to viewing the visual interface, wherein invalid linkages are grayed-out in the visual interface;

the first item represents a hardware component, wherein the properties of the first item include a plurality of instances of the hardware component; and the second item represents an event log that includes at least one of a severity, a date, and an identifier that uniquely identifies an event, and a message corresponding to the hardware component and the additional items in the visual interface.

8. The computer program product of claim 7, the operations further comprising:
highlighting, the linkage, in the user interface; and
in response to selecting the highlighted linkage in the user interface, displaying the new properties.

9. The computer program product of claim 7, wherein:
the first item and second item are nodes of a hierarchical tree displayed in the user interface, wherein the hierarchical tree displays a plurality of items including the first item and the second item, and wherein the plurality of items comprise elements of a software, hardware or firmware system; and
in response to selecting the first item and the second item and in response to determining that the linkage between the first item and the second item is a valid linkage, the linkage between the first item and the second item is highlighted in the user interface.

10. A method for deploying computing infrastructure, comprising integrating computer-readable code into a computational device, wherein the code in combination with the computational device performs operations, the operations comprising:
selecting, via a first user selection, a first item that is displayed in a user interface;
selecting, via a second user selection, a second item that is displayed in the user interface;
subsequent to selecting the first item and the second item, determining, via a computational device, a type of linkage between the first item and the second item, wherein the linkage is a displayed linkage, wherein a valid linkage indicates that inferences that relate the first item to the second item may be drawn by interpreting properties of the first item and properties of the second item, wherein a look-up table indicates operations that are to be performed by an application for the valid linkage;

in response to determining that the type of linkage between the first item and the second item is a valid linkage, interpreting the properties of the first item and the properties of the second item to infer new properties that relate the properties of the first item to the properties of the second item, wherein the inferred new properties are not explicitly indicated in the properties of the first item or the properties of the second item, and wherein the valid linkage remains active and visible until a user indicates the valid linkage is to be deactivated; and in response to determining that the type of linkage between the first item and the second item is an invalid linkage, indicating via a visual interface that the linkage between the first item and the second item is inapplicable, wherein:

the first item represents a server node and has server related information, and the second item represents a security node that has security related information for both clients and servers, and wherein in response to a selected linkage between the server node and the security node being clicked, security related information of the server node that are not explicitly indicated in either properties of the server node or properties of the security node are displayed;

the first item, the second item, and additional items displayed in the visual interface are all connected to a global bus, and the first item, the second item, and the additional items have linkages to each other;

invalid linkages are visually apparent to the user, in response to viewing the visual interface, wherein invalid linkages are grayed-out in the visual interface;

the first item represents a hardware component, wherein the properties of the first item include a plurality of instances of the hardware component; and the second item represents an event log that includes at least one of a severity, a date, and an identifier that uniquely identifies an event, and a message corresponding to the hardware component and the additional items in the visual interface.

11. The method for deploying computing infrastructure of claim 10, the operations further comprising:

highlighting, the linkage, in the user interface; and in response to selecting the highlighted linkage in the user interface, displaying the new properties.

12. The method for deploying computing infrastructure of claim 10, wherein:

the first item and second item are nodes of a hierarchical tree displayed in the user interface, wherein the hierarchical tree displays a plurality of items including the first item and the second item, and wherein the plurality of items comprise elements of a software, hardware or firmware system; and in response to selecting the first item and the second item and in response to determining that the linkage between the first item and the second item is a valid linkage, the linkage between the first item and the second item is highlighted in the user interface.

13. The method of claim 1, wherein:

a popup display of a user interface displays the new properties of the valid linkage;

the new properties includes event log entries filtered for a device, and instances of the device that require attention are displayed in the popup display.

14. The system of claim 4, wherein:

a popup display of a user interface displays the new properties of the valid linkage;

the new properties includes event log entries filtered for a device, and instances of the device that require attention are displayed in the popup display.

15. The computer program product of claim 7, wherein:

a popup display of a user interface displays the new properties of the valid linkage;

the new properties includes event log entries filtered for a device, and instances of the device that require attention are displayed in the popup display.

16. The method for deploying computing infrastructure of claim 10, wherein:

a popup display of a user interface displays the new properties of the valid linkage;

the new properties includes event log entries filtered for a device, and instances of the device that require attention are displayed in the popup display.

* * * * *